United States Patent [19]

Pursley

[11] Patent Number: 4,653,934

[45] Date of Patent: Mar. 31, 1987

[54] HEAT FLUX METER

[75] Inventor: Matt D. Pursley, Marietta, Ga.

[73] Assignee: Lockheed Corporation, Calabasas, Calif.

[21] Appl. No.: 720,072

[22] Filed: Apr. 4, 1985

[51] Int. Cl.[4] .......................................... G01N 25/20
[52] U.S. Cl. .................................... 374/31; 364/557; 364/569; 374/29; 374/53; 374/102
[58] Field of Search ................. 374/29, 30, 31, 53; 364/557

[56] References Cited

U.S. PATENT DOCUMENTS

| 3,367,182 | 2/1968 | Baxter | 374/29 |
| 3,436,534 | 4/1969 | Wallace | 364/557 X |
| 4,114,442 | 9/1978 | Pratt | 364/557 X |
| 4,555,764 | 11/1985 | Kuehn | 374/29 X |
| 4,568,198 | 2/1986 | Szabo et al. | 364/557 X |
| 4,577,976 | 3/1986 | Hayashi et al. | 374/29 |

Primary Examiner—Daniel M. Yasich

[57] ABSTRACT

A heat flux meter determines the heat transfer characteristics prior to processing or during steady-state autoclave heating conditions utilizing a monitoring element selected-thereof such that lumped heat transfer analysis is applicable thereto. During the curing process of a material, the heat flux meter calculates the instantaneous convection film coefficient for a particular location and determines the total present heat flux to an object.

6 Claims, 8 Drawing Figures

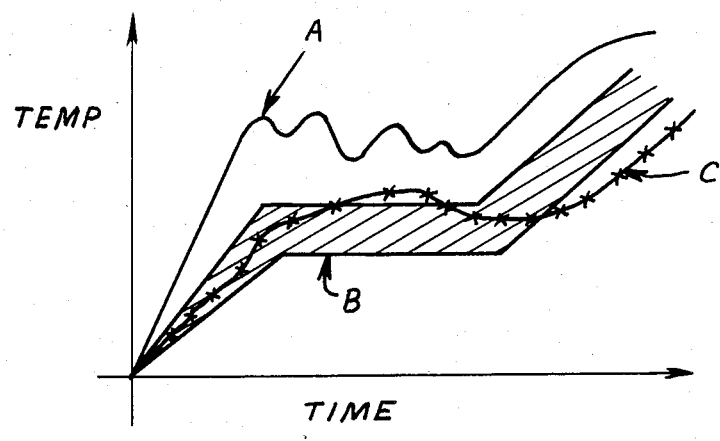
Fig_1
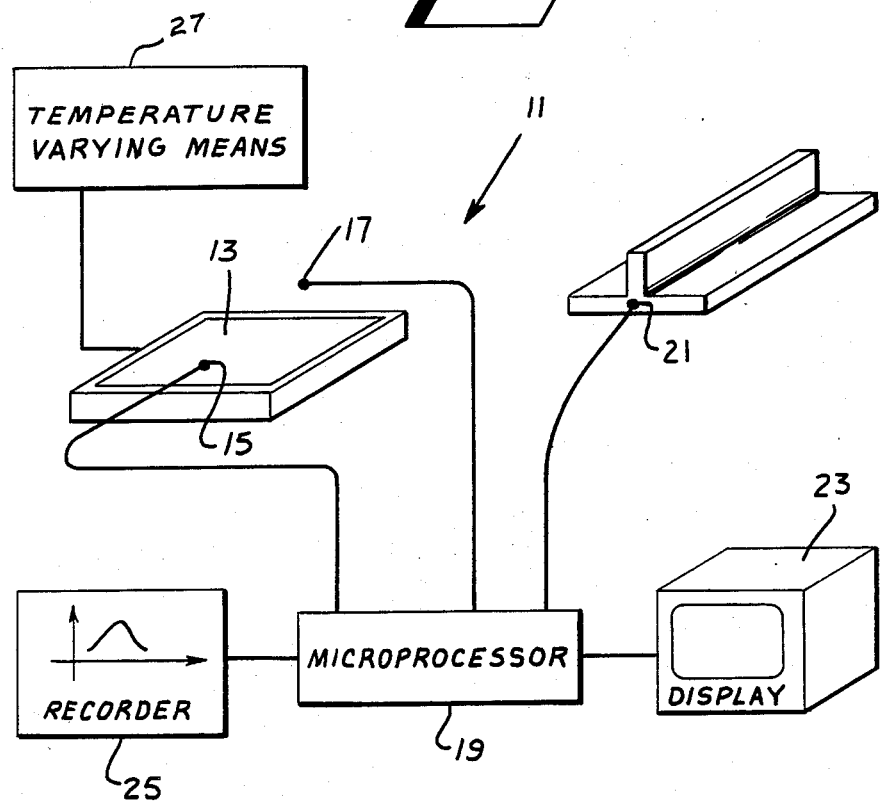
Fig_2

HEAT FLUX METER

TECHNICAL FIELD

The present invention generally relates to a heat flux meter for determining the heat transfer characteristics from a fluid to a solid surface, and more precisely, to a heat flux meter particularly adapted to determine the aforesaid heat transfer characteristics prior to processing or during steady-state autoclave heating conditions for the curing composite materials.

BACKGROUND ART

In applications where very high strength-to-weight ratios are desired, such as in helicopter rotor blades, aircraft structural components, re-entry vehicles, heat ablators, gas turbine components, and the like, composite materials are of particular utility. Typically, a composite material comprises a reinforcement which can be continuous or discontinuous in a matrix of another material, for example, graphite fibers in a thermosetting plastic resin.

The principal advantages of the composite are the combination of desired properties from the substituent materials and the designer's ability to tailor resulting properties to meet the needs of a specific application. The composite owes its effectiveness to the fact that the reinforcements and matrix bond quite readily. In the above-given example, graphite contributes to the high tensile strength of the composite, while the matrix is stronger in compression than in tension.

A major problem that has arisen in this technology is the lack of uniformity in the quality of the cured composite. Further, variability, whether batch-to-batch or within batch, is difficult to detect and makes quality control a formidable task. Thus, there exists a need for methods which reduce and/or control the factors that lead to variability in the quality of the composite material during the critical stages of manufacture.

One factor which affects batch quality is the heat transfer characteristics of the oven/autoclave employed to cure the composite parts. Typically, the autoclave is employed to drive a batch of composite parts through a specific temperature profile or cure cycle as recommended by the material suppliers or as developed by the material users. However, oftentimes, the heat transfer characteristics of the autoclave will vary from location to location within the autoclave itself. Such variations, whether due to the particular stacking configuration of the parts within the autoclave or the autoclave characteristics, result in inconsistent batch quality.

Heat transfer, as used herein relates to the transfer of energy or heat by virtue of a temperature difference. There are three modes of heat transfer: conduction, convection and radiation. The present invention is particularly directed at heat transfer by convection wherein energy is exchanged between a solid surface and an adjacent fluid, usually in motion.

There are at least two ways in which fluid motion can be produced in a heat transfer situation. There is forced convection wherein an external agent such as a pump or fan is employed to circulate the fluid. Additionally, there is natural convection wherein the fluid is set in motion by the buoyant force resulting from density changes in the fluid caused by temperature differences therein. The present invention is concerned with both of the above-mentioned types of convection heat transfer.

In order to access the heat transferred between a fluid and a solid surface, one must know the convective heat transfer coefficient h which is defined as follows:

$$h = \frac{Q/A}{(T_s - T_{\infty})}$$

wherein
 Q/A is the heat flow per unit surface area
 $T_s$ is the surface temperature, and
 $T_{\infty}$ is the free-field temperature of the fluid (i.e. outside the boundary layer). The convective coefficient h represents a relative conductance between the solid surface and the fluid. The coefficient varies with fluid properties, flow geometry, and temperature level.

Variations in the heat transfer characteristics of the autoclave can affect batch quality due to the inherent weakness of certain crosslinking polymers, such as many thermosetting plastic resins, during and after gelation. Because gelation is usually followed by vitrification, a partially cured resin has virtually no strain capability. Thus, if the recommended cure cycle is not properly instituted, a real possibility of matrix fracturing exists. This damage is permanent, and the result, in the cured composite, is microcracking or delamination or both. A further possibility is weak interfacial bands between the matrix and reinforcements caused by the imposition of intolerable shear stresses on the resin after gelation and prior to a complete cure.

Currently, air temperature heating cycles for oven-/autoclaves are derived or generated through trial and error techniques in order to drive a part or batch of parts through a specific cure temperature profile. When the oven/autoclave heating loads are varied to an extent which results in a deviation from the anticipated heat transfer characteristics from the air to the part, bad parts result. Thus, there exists a need for a heat transfer monitoring device for use during the cure processing of composite parts.

DISCLOSURE OF INVENTION

It is, therefore, an object of the present invention to provide a heat flux meter for determining the heat transfer characteristics between a fluid and a solid surface prior to processing or during heat-up, cool-down, or steady-state autoclave conditions.

Another object of the present invention is to provide a heat flux meter having a heat flux monitoring element that can be shaped and segmented to determine heat transfer characteristics for particularly complex shapes.

It is yet another object of the present invention to provide a heat flux meter which can be employed as a feedback device for an oven/autoclave controller.

Yet another object of the present invention is to provide a heat flux meter which is relatively simple in construction and simple to manufacture.

One feature and a particular advantage of the present invention is that the heat flux meter includes a monitoring element temperature with means for varying the temperature of the monitoring element. This comprises, for example, an electrical resistance heater, or the like, for heating the monitoring element prior to start-up of an autoclave or during steady-state operation in order to determine local heat flux characteristics within the autoclave. The use of the monitoring element varying means is necessitated by the fact that the heat flux meter operates by measuring the rate of change of the thermodynamic condition of the monitoring element.

In accordance with these and other objects, features, and advantages of the present invention, there is provided a heat flux meter for determining the total heat input to a part having a known surface area A. The meter comprises a monitoring element having a known mass M, a known surface area $A_E$, and a known specific heat $C_p$, the monitoring element being constructed from a material and sized such that lumped heat transfer analysis is applicable thereto. A clock means continuously measures a given time interval T and provides a clock output representative thereof. Monitoring element temperature determining means provides monitoring element temperature data $T_E$ during each of the given time intervals while fluid temperature and part temperature determining means provide fluid temperature and part temperature data $T_F$ and $T_S$, respectively, during each of the given time intervals. Film coefficient calculating means receives the clock output and temperature data $T_E$ and $T_F$ and calculates as well as provides film coefficient data h, during each of said given time intervals as follows:

$$h = \frac{M C_p d_E{}^T}{A_E(T_E - T_F)}$$

wherein: $dT_E$ is the rate of temperature change of the monitoring element during the given time interval T. Heat flux calculating means receives film coefficient data h and calculates and provides instantaneous heat flux into the part data $Q_T$ for each of the given time intervals as follows: $Q_T = hA(T_F - T_S)$.

The heat flux meter further comprises a summing means for continuously summing the instantaneous heat flux data $Q_T$ obtained for each of the time intervals and provides for summed total heat data $Q_S$ into the part.

BRIEF DESCRIPTION OF THE DRAWINGS

FIG. 1 is a graphic representation illustrating fluid and part temperature variations with respect to time during the cure of a composite part;

FIG. 2 is a block diagram illustrating the various elements of a number of different embodiments of the heat flux member of the present invention;

BEST MODE FOR CARRYING OUT THE INVENTION

Figure 3:
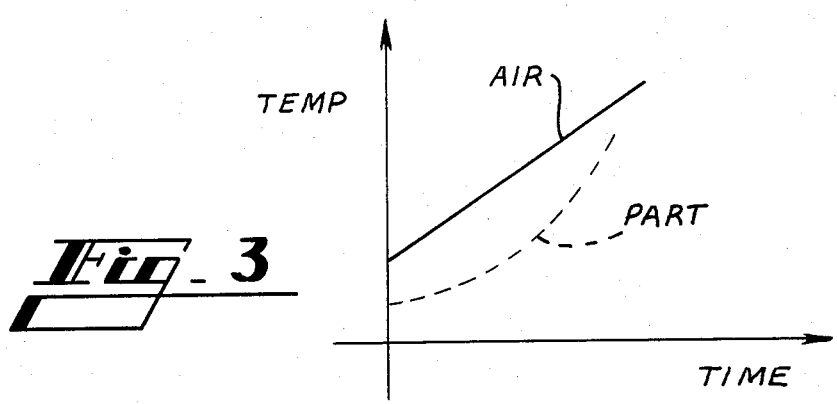
FIG. 3 is a graphic representation of the temperature dependence between a heated fluid and the monitoring element of the present invention.

During the cure of a composite part, the fluid temperature within an autoclave is driven through a temperature cycle, as represented generally by reference numeral A of FIG. 1, in order to drive the temperature of the part or batch of parts through a required cure temperature profile, as generally indicated by reference numeral B. However, often the actual temperature of the part, generally indicated by reference numeral C, deviates from the required specific cure temperature profile B which results in a defective cure and a bad part.

In order to better access the actual temperature of the composite part during cure, the heat flux meter 11 of the present invention calculates the instantaneous convection film coefficient for the heated fluid within the autoclave for a particular location in order to determine the present heat flux to the part. Referring to FIGS. 2 and 3, a heat flux meter is generally indicated at 11 and in its simplest form comprises a monitoring element 13, a monitoring element temperature determining means 15, a fluid temperature determining means 17 positioned adjacent monitoring element 13 and a controller 19. The controller 19 takes the form of, for example, a programmable microprocessor, either digital or analog, and receives temperature data from the temperature determining means 15 and 17 in order to calculate convection film coefficient data h.

One of the inventive aspects of the present invention is the construction of as well as the conceptualization of the monitoring element 13. Element 13 is constructed from a material and sized such that lumped heat transfer analysis is applicable thereto, such that element 13 has a known mass M, a known surface area $A_E$ and a known specific heat $C_p$. Some suggested materials are aluminum or steel, the configuration and size of the element 13 being discussed in more detail hereinafter.

Because lumped heat transfer analysis is applicable to element 13 and temperature data regarding the element 13 and adjacent fluid is available, it is possible to program controller 19 to solve for the film coefficient h based on the rate of temperature of the monitoring element 13. Once the value of the film coefficient h is known, it is possible to calculate the total heat flux into the part if the temperature and surface area A of the part is known. Thus, according to another embodiment of the present invention, flux meter 11 further comprises a part temperature determining means 21 which is affixed to a tool or part at a single or a plurality of locations. Additionally, display 23 and recorder 25 are included in order to display and record various, as well as temperature varying means 27 for heating and cooling the part, discussed in further detail below.

To program controller 19, since monitoring element 13 is constructed so as to have a known mass M, a known surface area $A_E$, and a known specific heat $C_p$, this data is programmed into the computer, for example, by software or by means of hardware such as PROM's, EPROM's and the like. Since all current microprocessors have clock pulse generators, it is possible to calculate the convection film coefficient h as follows:

$$h = \frac{MC_p \frac{dT_E}{T}}{A_E(T_E - T_F)}$$

wherein:
M is the known mass of element 13,
$C_p$ is the known specific heat of element 13,
$dT_E$ is the rate of temperature change of element 13 for a given time interval, T,
$A_E$ is the known surface area of the element 13,
$T_E$ is the temperature of the element 13, and
$T_F$ is the temperature of the fluid adjacent the element 13.

If h is known, it is possible to program controller 19 to calculate the present heat flux $Q_T$ into the part as follows:

$$Q_T = hA(T_F - T_S)$$

wherein:
A is the surface area of the part,
$T_F$ is the temperature of the fluid, and
$T_S$ is the temperature of surface of the part.

Based on the total heat input $Q_S$ into the part, which is calculated by continuously summing the present heat data $Q_T$ into the part data for each given time interval, it is possible to predict the internal temperature of the part. In light of the following, the heat flux meter 11 can be employed to provide useful information for the control of the autoclave as will be more fully explained hereinafter.

According to yet another embodiment of the present invention, a plurality of monitoring elements 13 are positioned at specific locations within an autoclave/oven. In this manner, it is possible to access the local convection coefficient h for various locations within the autoclave/oven. This is necessary because localized heating may vary depending on the stacking configuration of the parts within the autoclave/oven and/or the specific heating characteristics of the autoclave/oven itself. Thus, by varying the convection currents within the autoclave/oven, by means of fans, pumps or the like, localized heating can be controlled.

The heat flux meter 11 of the present invention provides film coefficient data h based on the rate of temperature change of element 13. If the monitoring element 13 is heated or cooled, it will respond in a manner as shown in FIG. 3. At any instant during the autoclave heat-up or cool-down period, the film coefficient h, i.e. heat transfer from fluid to surface, can be calculated as disclosed above. However, during steady state conditions, i.e. no temperature variations between fluid and surface, this information can not be so gained. Thus, the element 13, according to one embodiment thereof, further comprises a monitoring element temperature varying means 27 for varying the temperature of element 13 during steady-state heating or alternatively prior to heating.

Figure 4A:
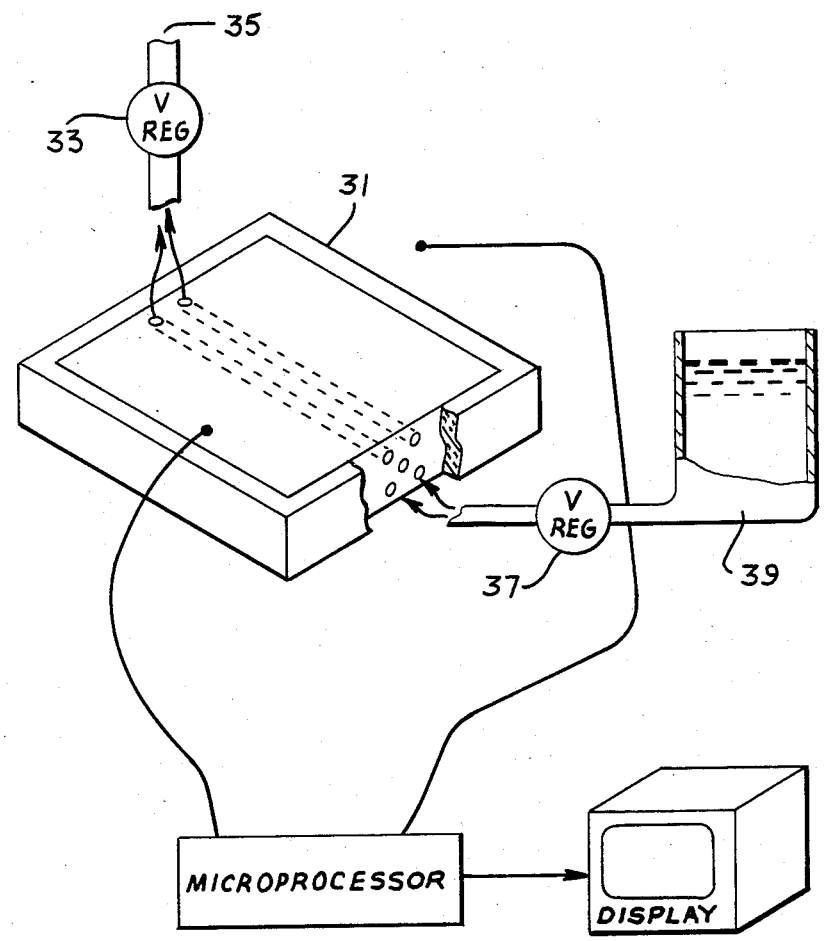
FIGS. 4A-4B illustrate various embodiments of the monitoring element temperature varying means of the present invention.
Figure 4B:
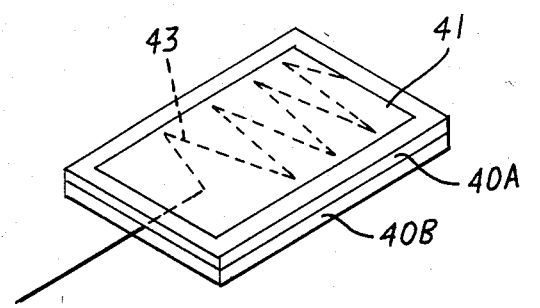

Referring to FIGS. 4A and 4B, two embodiments of the temperature varying means 27 are illustrated, one for cooling or heating as shown in FIG. 4A and, one for heating, as shown in FIG. 4B. In FIG. 4A, the monitoring element 13 comprises, for example, a flat plate 29, made from, for example, aluminum and having a plurality of heat exchange tubes 31. The edges of plate 29 are insulated by insulation means 33 adapted to permit the flow of a heat exchange fluid, such as, for example, freon for cooling or steam for heating to the heat exchange tubes 31. An exhaust pressure regulator 33 controls the flow of the heat exchange fluid to an exhaust 35 and a second pressure regulator 37 controls the flow of the heat exchanger fluid from a source 39.

Alternatively, the temperature varying means comprises a pair of flat plates 40A, 40B having insulated edges 41, wherein an electrical resistance heater 43 is sandwiched therebetween as shown in FIG. 4B. The plates are held together adhesively or by means of mechanical restraints such as clamps or the like.

Figure 5A:
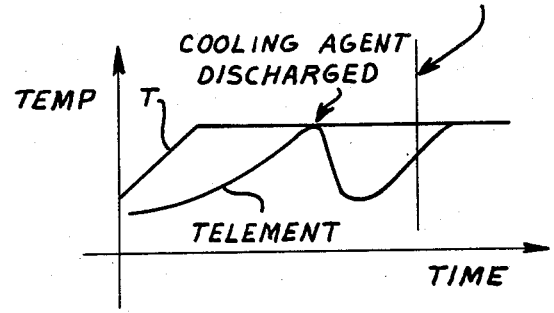
FIGS. 5A-5B are graphic representations of the temperature variations of the monitoring element during use of the temperature varying means.
Figure 5B:
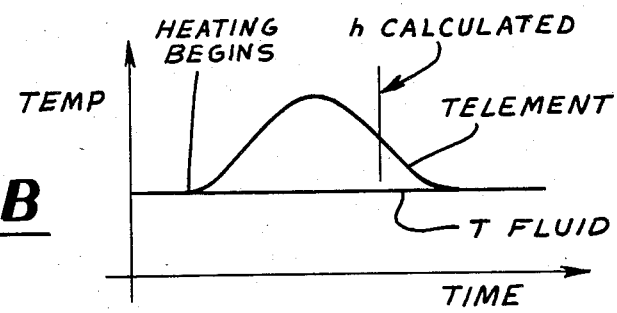

In a situation where the cure is in process and the autoclave/oven is heated to a steady state condition, a cooling medium is introduced to element 13 or element 13 is heated. Once the element 13 is cooled below or heated above the fluid temperature, as shown in FIGS. 5A and 5B, the element 13 begins to heat-up or cool off where upon, film coefficient data h is calculated. This permits film coefficient h determinations during steady state conditions due to, for example, changes in pressure, fluid flow, or the like.

This process may be performed prior to the autoclave heating which yields significant information prior to processing. Before autoclave heating, the element is heated or cooled with varying means. If the element warms or cools quickly, after cooling or heating, there is good heat transfer in the vicinity of the element and the associated part should process properly. If the meter does not warm or cool quickly after cooling or heating, there is *not* good heat transfer in the vicinity of the element and the associated part will not process properly.

Figure 6:
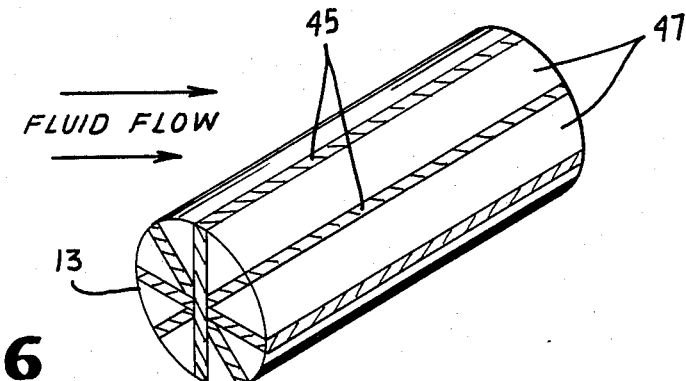
FIG. 6 is an alternative embodiment of the monitoring element which has a complex shape.

In accordance with yet another embodiment of the present invention, the configuration of monitoring element 13 is varied to provide specific information regarding heat flux to a complex shape. As shown in FIG. 6, the monitoring element is cylindrical in shape and has insulating segments 45 which run the length of the element 13 and bisect the center of the circle formed by the cylindrical configuration. Consider the situation where fluid flow is perpendicular to the length of the element, heat transfer characteristics will vary around the circumference of the element. Thus, by monitoring the temperature of each element segment 47, film coefficient data about complex shapes are ascertainable.

While the invention has been particularly shown and described with reference to various embodiments thereof, it will be understood by those skilled in the art that various alterations in form and detail will be made therein without departing from the spirit and scope of the invention as defined by the appended claims.

I claim:
1. A heat flux meter for determining the total heat input to a part surrounded by a fluid, the part having a known surface area A comprising:
 (a) a monitoring element adjacent the part having a known mass M, a known surface area $A_E$ and a known specific heat $C_p$, said monitoring element being constructed from a material and sized such that lumped heat transfer analysis is applicable thereto;
 (b) a clock means for continuously measuring a given time interval T and for providing a clock output representative thereof;
 (c) monitoring element temperature determining means for determining the temperature of said monitoring element during each of said given time intervals and for providing data $T_E$ representative thereof;
 (d) fluid temperature determining means for determining the temperature of the fluid adjacent said monitoring element during each of said given time intervals and for providing data $T_F$ representative thereof;
 (e) part temperature determining means for determining the surface temperature of the part during each of said given time intervals and for providing data $T_S$ representative thereof;
 (f) film coefficient calculating means for receiving said clock output and said temperature data $T_E$ and $T_F$ and for calculating and providing film coeffici- ent data h during each of said given time intervals as follows:

$$h = \frac{MC_p \frac{dT_E}{T}}{A_E(T_E - T_F)}$$

wherein: $dT_E$ is the rate of temperature change of said monitoring element during said given time interval T; and (g) heat flux calculating means for receiving said film coefficient data h and for calculating and providing instantaneous heat flux data $Q_T$ into the part for each of said given time intervals as follows:

$Q_T = hA(T_F - T_S)$.

2. A heat flux meter according to claim 1 further comprising a summing means for continuously summing the instantaneous heat flux data $Q_T$ obtained for each of said time intervals and providing summed total heat data $Q_S$ into the part.

3. A heat flux meter according to claim 2 further comprising a monitoring element temperature varying means for varying the temperature of said monitoring element.

4. A heat flux meter according to claim 3 wherein said monitoring element comprises a flat plate having insulated edges.

5. A heat flux meter according to claim 3 wherein said monitoring element has a substantially cylindrical configuration and includes a plurality of insulating segments which run the length of said monitoring element, each segment bisecting the cross-section of the circle of said substantially cylindrical configuration.

6. A heat flux meter according to claim 3 wherein said monitoring element is shaped similar to the part for which heat flux measurements are desired.

* * * * *